(12) United States Patent
Dahlquist et al.

(10) Patent No.: US 10,829,084 B2
(45) Date of Patent: Nov. 10, 2020

(54) BELT RETRACTOR HAVING A FORCE LIMITATION DEVICE

(71) Applicant: AUTOLIV DEVELOPMENT AB, Vargarda (SE)

(72) Inventors: Bengt Dahlquist, Dalsjofors (SE); Robert Svensson, Fristadt (SE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 109 days.

(21) Appl. No.: 16/085,051

(22) PCT Filed: Mar. 13, 2017

(86) PCT No.: PCT/EP2017/055793
§ 371 (c)(1),
(2) Date: Sep. 14, 2018

(87) PCT Pub. No.: WO2017/157829
PCT Pub. Date: Sep. 21, 2017

(65) Prior Publication Data
US 2019/0077367 A1    Mar. 14, 2019

(30) Foreign Application Priority Data
Mar. 14, 2016   (DE) .......................... 10 2016 104 614

(51) Int. Cl.
*B60R 22/41*   (2006.01)
*B60R 22/34*   (2006.01)
*B60R 22/28*   (2006.01)

(52) U.S. Cl.
CPC .... *B60R 22/3413* (2013.01); *B60R 2022/287* (2013.01); *B60R 2022/288* (2013.01)

(58) Field of Classification Search
CPC ................ B60R 22/41; B60R 22/3413; B60R 2022/287; B60R 2022/288
See application file for complete search history.

(56) References Cited

U.S. PATENT DOCUMENTS 6,616,081 B1   9/2003   Clute et al.
6,749,225 B1   6/2004   Clute et al.
(Continued)

FOREIGN PATENT DOCUMENTS

DE          199 27 427 A1    1/2001
DE     10 2006 049 840 A1    4/2008
(Continued)

OTHER PUBLICATIONS

International Search Report of PCT/EP2017/055793 dated Jun. 8, 2017.

*Primary Examiner* — Sang K Kim
(74) *Attorney, Agent, or Firm* — Dickinson Wright PLLC

(57) ABSTRACT

A belt retractor for a motor vehicle seat belt, with a belt shaft (1) in a housing frame, a profile head (2) which can be locked and a force limitation device (3) with a first end (4) coupled to the profile head (2) and a second end (5) is coupled to the belt shaft (1) and which allows a force-limited relative rotation of the belt shaft (1) with regard to the locked profile head (2). A connection tube (6) surrounds the force limitation device (3) with a locking hook (7), which during the relative rotation with regard to the profile head (2) slides over an external circumference of the connection tube (6) and on reaching a predetermined angle of rotation of the belt shaft (1) engages in a locking groove (8) on the connection tube (6), the coupling the connection tube (6) to the belt shaft (1) The connection tube (6) is produced in one piece with the profile head (2), so that on engagement of the locking hook (7) in the locking groove (8) the belt shaft (1) is locked via the profile head (2) to the housing frame in a non-rotational manner.

6 Claims, 2 Drawing Sheets

(56) References Cited

U.S. PATENT DOCUMENTS

| | | | |
|---|---|---|---|
| 7,637,451 B2 | 12/2009 | Gentner et al. | |
| 8,727,257 B2 | 5/2014 | Dahlquist et al. | |
| 9,527,476 B2 | 12/2016 | Wigstrom et al. | |
| 2012/0074253 A1* | 3/2012 | Dahlquist | B60R 22/3413 242/384.7 |
| 2015/0298649 A1* | 10/2015 | Wigstrom | B60R 22/3413 242/382.1 |

FOREIGN PATENT DOCUMENTS

| | | |
|---|---|---|
| DE | 10 2009 024 292 A1 | 12/2010 |
| DE | 10 2012 107 557 B3 | 10/2014 |
| EP | 3 045 356 A1 | 7/2016 |
| WO | WO 99/06249 A1 | 2/1999 |

\* cited by examiner

BELT RETRACTOR HAVING A FORCE LIMITATION DEVICE

CROSS-REFERENCE TO RELATED APPLICATIONS

This application is a 35 U.S.C. § 371 national phase application of PCT International Application No. PCT/EP2017/055793, filed Mar. 13, 2017, which claims the benefit of priority under 35 U.S.C. § 119 to German Patent Application No. 10 2016 104 614.0, filed Mar. 14, 2016, the contents of which are incorporated herein by reference in their entirety.

FIELD OF THE INVENTION

The present invention relates to a belt retractor for a seat belt of a motor vehicle, with a belt shaft borne in a rotating manner in a housing frame, a profile head which can be locked with regard to the housing frame and a force limitation device which with a first end is coupled to the profile head and with a second end is coupled to the belt shaft and which allows a force-limited relative rotation of the belt shaft with regard to the locked profile head. A connection tube at least partially surrounding the force limitation device and with a locking hook, which during the relative rotation of the belt shaft with regard to the profile head slides over an external circumference of the connection tube and on reaching a predetermined angle of rotation of the belt shaft engages in a locking groove formed on the circumference of the connection tube, as a result of which the connection tube is coupled to the belt shaft.

BACKGROUND

A belt retractor with the aforementioned features is known from DE 10 2012 107 557 B3 (which is incorporated herein in its entirety), in which, through the engagement of the locking hook in the locking groove, the force limitation device is switched from a low force limitation level to a higher force limitation level. However, in some applications it is desirable that after a pre-definable force limitation procedure the relative rotation of the belt shaft with regard to the profile head locked together with the housing frame is stopped.

The aim of the present invention is therefore to a least partially eliminate the drawbacks described in relation to the prior art, and, in particular, to propose a belt retractor with which the force-limiting relative rotation between the belt shaft and the profile head is stopped after reaching a predetermined angle of relative rotation.

SUMMARY

The above-referenced task is achieved in particular in accordance with the present invention through a belt retractor with the features described in this specification. Advantageous further embodiments of the belt retractor are set out in the description, wherein individual features of the advantageous further embodiments can be combined with each other in any technologically rational manner.

The task is solved in particular in accordance with the present invention through a belt retractor with the features set out in the introductory section, wherein the connection tube is produced in one piece with the profile head so that on engagement of the locking hook in the locking groove the belt shaft is locked to the housing frame in a non-rotational manner. In this way, after reaching the angle of rotation defined by the engagement of the locking hook in the locking groove, the relative rotation of the belt shaft with regard to the locked profiled head is stopped. Additionally, through the production of the profile head in one piece with the connection tube, the number of components of the belt retractor is reduced.

Also connected with the invention is the further advantage that the force limitation device, consisting of two torsion bars in accordance with the state of the art, can now only employ a single torsion bar as the only element of the force-limiting device. It is also not necessary to replace a torsion bar with a non-torsion element. In this way component savings can be made compared with the prior art.

SUMMARY AND INTRODUCTORY DESCRIPTION

The general layout and the function of a belt retractor as well as its component parts are known from DE 10 2012 107 557 B3 as well as from DE 10 2009 024 292 A1 (which is incorporated herein in its entirety), with reference being made to the entire scope of their contents.

In accordance with one embodiment of the belt retractor in accordance with the present invention the locking hook is rigidly connected to a catch which engages in a screw-like groove formed on the connection tube in such a way that during relative rotation of the locking hook with regard to the connection tube, an axial displacement of the locking hook with regard to the connection tube takes place, wherein during the initial rotation of the locking hook, the locking hook projects axially over the locking groove formed on the connection tube and is supported on the connection tube and only engages in the locking groove after an axial displacement of the locking hook brought about by the relative rotation of the belt shaft. In this way, via the length of the groove into which the catch engages, the angle of rotation can be determined after which non-rotational coupling of the belt shaft with the profile head, which is locked with regard to the housing frame, takes place.

Alternatively, in order to predefine a particular angle of rotation for engagement of the locking hook into a locking groove, a spacer could be formed between the locking hook and the surface of the connection tube as well as a recess corresponding to the spacer on the surface of the connection tube, wherein on initial passing of the locking hook across the locking groove the spacer prevents the locking hook entering the locking groove. Thereafter, the spacer enters the corresponding recess and is uncoupled from the locking hook so that on renewed reaching of the locking groove the locking hook enters the locking groove. A spacer of this type is already described in DE 10 2012 107 557 B3.

In particular also independently of the one-piece design of the profile head with the connection pipe, in another embodiment of the invention it can be envisaged that the force limitation device or a torsion bar of the force limitation device at both its first end and at its second end has several radially projecting teeth, with which the force limitation device, in particular the torsion bar, is connected to two components of the belt retractor, wherein the number of teeth of the second end is greater than the number of teeth at the first end. Alternatively, the number of teeth of the first end can also be greater than the number of teeth at the second end. For example, one end has at least double the number of teeth compared to the number of teeth at the other end. Insofar as through the teeth a relative angular position to the component of the belt retractor is defined, through a greater number of teeth the angle between two adjacent positions can be reduced so that the stop function can be adjusted more precisely. In particular, the number of teeth of the one end is preferably a multiple of the number of teeth at the other end.

Preferably, the teeth of the first end are formed offset in the peripheral direction to the teeth of the second end, in particular if the same amount of teeth are formed on both ends. In particular, the teeth of the first end and the teeth of the second end are arranged offset to each other with an angle from 20° to 70° in peripheral direction, in particular with an angle from 25° to 35° or with an angle from 55° to 65°, preferably with an angle of 30° or 60°.

In order to provide a secure connection with the corresponding component of the belt retractor, it can be envisaged that at least two teeth of one end form a rib with their radial outer circumferential configurations through which a non-positive connection with the profile head or the belt shaft is achieved. More particularly, each second tooth of the end of the torsion bar with the greater number of teeth has a rib.

BRIEF DESCRIPTION OF THE DRAWINGS

Using the figures, the invention as well as the technical domain will be described below in the form of an example. Schematically.

DETAILED DESCRIPTION

Figure 1:
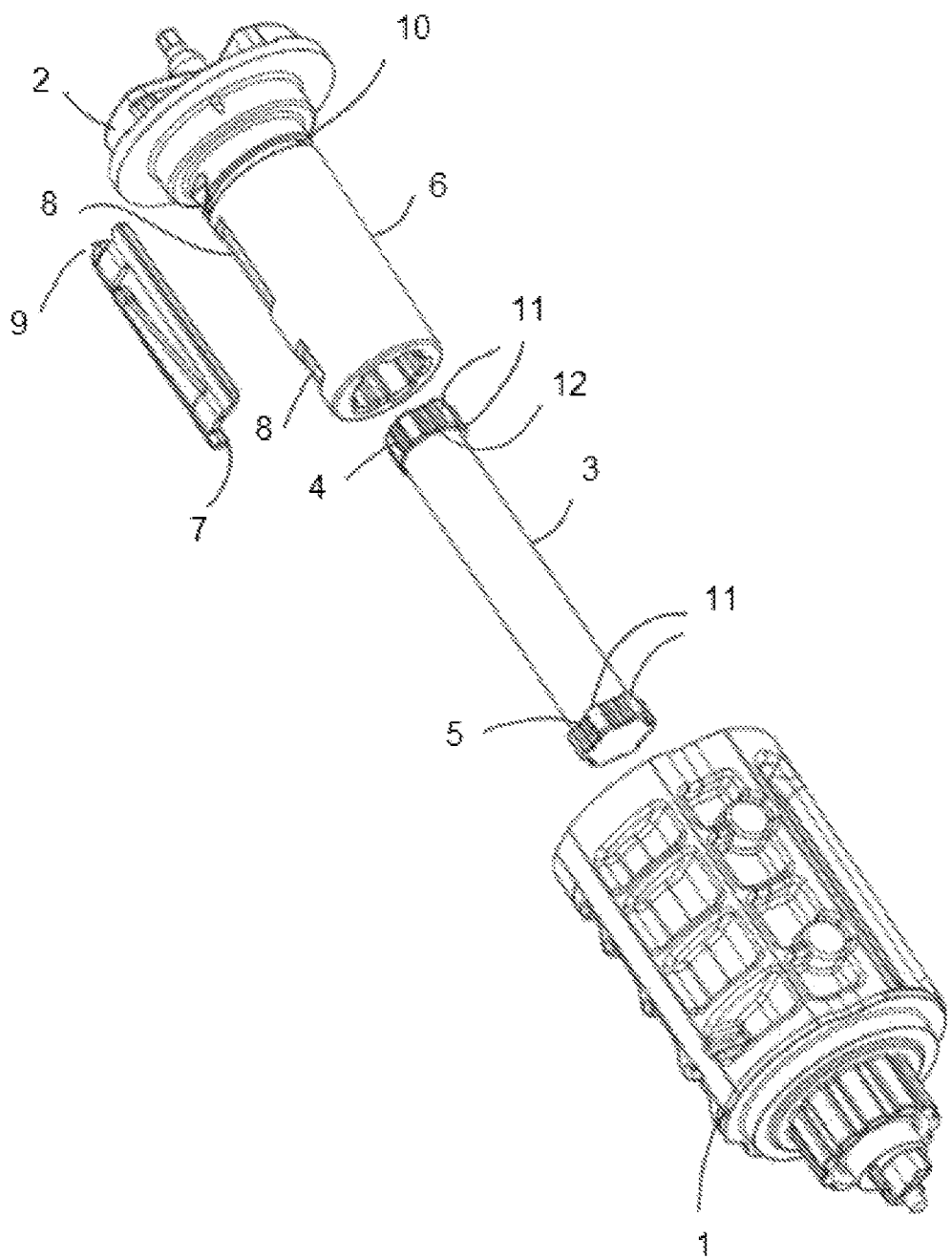
FIG. 1 shows an exploded view of the essential components of a belt retractor and FIG. 2 shows a torsion bar.

FIG. 1 shows the components of a belt retractor in accordance with an embodiment of the present invention. The belt retractor has a profile head 2, on which a connection tube 6 is formed preferably in one piece. Formed on an outer circumference of the connection tube 6 are locking grooves 8 and a groove 10 extending in a helical screw-like manner. Arranged in the connection tube 6 is a force limitation device 3 which is designed as a torsion bar and at a first end 4 has radially projecting teeth 11 with which the force limitation device 3 is connected to the profile head 2 in a non-rotational manner (i.e. fixed regarding relative rotation). Between the teeth 11, ribs 12 are formed by means of which a meshing connection with the profile head 2 is achieved. The belt retractor also includes a belt shaft 1, which via teeth 11 on a second end 5 of the force limitation device 3 is connected to the force limitation device 3 in a non-rotational manner (i.e. fixed regarding relative rotation). The belt retractor also includes a locking hook 7 which in the assembled state, is arranged in a spring-preloaded manner between the belt shaft 1 and the connection tube 6, wherein the locking hook 7 is connected to the belt shaft 1.

If a force limitation procedure is initiated in a known manner through the profile head 2 being locked with a housing frame, a relative rotation of the belt shaft 1 in the direction of pulling out of the associated seat belt takes place with regard to the locked profile head 2, during which the force limitation device 3 is twisted and it torsionally deflects. In the initial position, the locking hook 7 is axially offset with regard to the locking groove 8 in the connection tube 6 (i.e. the locking hook 7 is not in a position to drop into groove 8). Moreover, the catch 9 is in engagement with the screw-shape groove 10. During the relative rotation, the locking hook 7 is now entrained within the center cavity of the belt shaft 1 to move only in the axial direction, wherein the catch 9 runs in the groove 10 arranged in a screw-like manner and thus produces an axial displacement of the locking hook 7 drops into and with regard to the connection tube 6 and groove 8. After an axial displacement predetermined by the pitch of the groove 10 and a corresponding relative rotation, the locking hook 7 engages with the locking groove 8. At this moment the belt shaft 1 is connected to the locked profile head 2 in a non-rotational manner by way of the locking hook 7 and the connection tube 6 so that further relative rotation is prevented and further torsional deflection of the force limitation device 3 is stopped.

Figure 2:
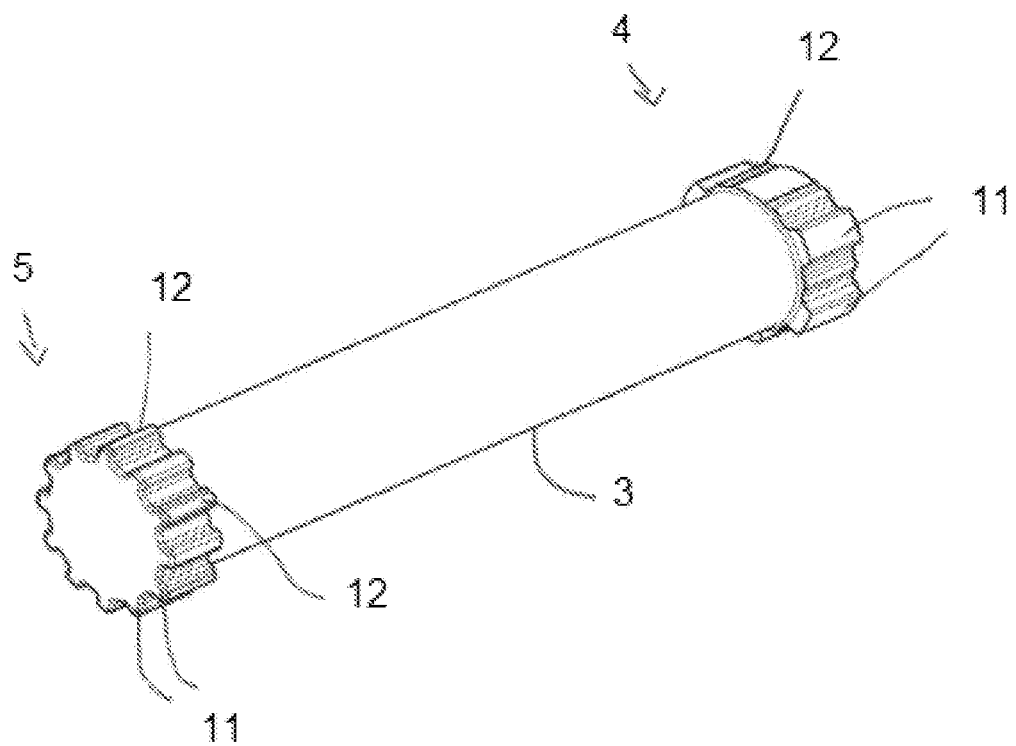

FIG. 2 shows a torsion bar designed as a force limitation device 3, with a first end 4 and a second end 5. At each of the two ends 4 and 5 the torsion bar has several radially projecting teeth 11. At the second end 5 the number of teeth 11 is double the number of teeth at the first end 4. For non-positive connection of the torsion bar to a component of the belt retractor, between the teeth 11 of the first end 4, ribs 12 are formed which extend in the axial direction. At the second end 5, ribs 12 are formed on a radially outer side of the teeth 11. The ribs 12 are only formed on every second tooth 11 on the second end 5. The arrangement of teeth 11 at ends 4 and 5 allow the relative rotational orientations of belt shaft 1 and profile head 2 to be adjusted, which changes the angle charge permitted between the components until hook 7 drops into groove 8.

While the above description constitutes the preferred embodiment of the present invention, it will be appreciated that the invention is susceptible to modification, variation and change without departing from the proper scope and fair meaning of the accompanying claims.

The invention claimed is:

1. A belt retractor for a seat belt of a motor vehicle, with a belt shaft rotatable within a housing frame comprising, a profile head which can be locked with regard to the housing frame and a force limitation device with a first end coupled to the profile head and a second end coupled to the belt shaft which allows a force-limited relative rotation of the belt shaft with respect to the profile head in a locked state, a connection tube at least partially surrounds the force limitation device and a locking hook, which during the relative rotation of the belt shaft with respect to the profile head slides over an external circumference of the connection tube and on reaching a predetermined angle of rotation of the belt shaft with respect to the profile head, engages in a locking groove formed on the external circumference of the connection tube, as a result of which the connection tube is coupled to the belt shaft, the connection tube is produced in one piece with the profile head, so that on engagement of the locking hook in the locking groove, the belt shaft is locked by the profile head to the housing frame in a non-rotational manner.

2. The belt retractor according to claim 1 further comprising, the locking hook is rigidly connected to a catch which engages in a screw-like groove formed on the connection tube in such a way that during the relative rotation of the belt shaft with respect to the connection tube an axial displacement of the locking hook with respect to the connection tube takes place, wherein during an initial rotation of the locking hook with respect to the connection tube, the locking hook projects axially over the locking groove formed on the connection tube and is supported on the connection tube and engages in the locking groove after an axial displacement of the locking hook brought about by the relative rotation of the belt shaft.

3. The belt retractor according to claim 1 further comprising, at both the first end and the second end the force limitation device has several radially projecting teeth with which the force limitation device is connected at the first end to the profile head and at the second end to the belt shaft, wherein the number of the teeth of one of the first and the second end is greater than the number of teeth at the other of the first end and the second end.

4. The belt retractor according to claim 1 further comprising, at both the first end and the second end the force limitation device has several radially projecting teeth with which the force limitation device is connected at the first end to the profile head and at the second end to the belt shaft, wherein with a radial outer circumferential configuration at least two teeth of the first end or the second end forms a rib through which a connection with the profile head or the belt shaft is achieved.

5. The belt retractor according to claim 1 further comprising, at both the first end and the second end the force limitation device has several radially projecting teeth with which the force limitation device is connected at the first end to the profile head and at the second end to the belt shaft, whereby the angular position of the teeth of the first end is displaced relative to the teeth of the second end.

6. The belt retractor according to claim 1 further comprising, when the locking hook engages the locking groove, the locking hook is trapped from rotating along the external circumference of the connection tube, thereby rotatably coupling together the connection tube and the belt shaft.

* * * * *